United States Patent Office 3,047,406
Patented July 31, 1962

3,047,406
METHODS FOR PREPARING OXIDATIVELY
ACTIVE COMPOSITIONS
Charles G. Ferrari, Evanston, and Kazuo Higashiuchi, Chicago, Ill., assignors to J. R. Short Milling Company, Chicago, Ill., a corporation of Illinois
No Drawing. Filed June 23, 1959, Ser. No. 822,177
8 Claims. (Cl. 99—232)

This invention relates to methods for producing oxidatively active compositions and to the resulting products and more particularly to the production of oxidatively active compositions having unusual commercial utility from methyl ethyl ketone and hydrogen peroxide.

We have discovered that, under certain conditions, methyl ethyl ketone and hydrogen peroxide will react to form oxidatively active reaction product mixtures possessing such oxidative activity as to be useful for both bleaching and maturing wheat flour and for bleaching other materials heretofore difficult to bleach.

Stated broadly, the present method effects reaction of methyl ethyl ketone and hydrogen peroxide in the liquid phase to produce a mixture of predominantly acyclic hydroperoxidic compounds. Methyl ethyl ketone and aqueous hydrogen peroxide are combined in proportions providing in the initial reaction mixture from .5 to 2.5 moles of hydrogen peroxide for each mole of methyl ethyl ketone and the resulting initially homogeneous reaction mixture is maintained below 100° C. until, upon standing at normal temperature, the reaction mixture separates into two phases of different specific gravity, the phase of lower specific gravity predominantly comprising methyl ethyl ketone peroxides and free methyl ethyl ketone. Advantageously, an acid catalyst is employed in proportions up to 5% by weight of the reaction mixture, to accelerate formation of the oxidatively active reaction product. Depending upon the relative proportions of methyl ethyl ketone and hydrogen peroxide, the amount of water introduced into the reaction mixture with the hydrogen peroxide or otherwise, the temperature at which the reaction mixture is maintained, and whether or not the reaction mixture is agitated, the reaction time may be selected within the range of from 1 minute to 48 hours.

Though the yield of methyl ethyl ketone peroxides is sufficiently high to allow use of the entire reaction product mixture as a novel oxidatively active composition effective for various purposes where the relatively lower concentrations of oxidatively active agents are used, the reaction product mixtures produced in accordance with the invention are admirably suited to concentration in various ways. First, the phase of lower specific gravity, amounting to as much as 80% by volume of the total reaction product mixture, is easily recoverable from the higher specific gravity material, only a minor proportion of the oxidatively active products remaining in the higher specific gravity material. Next, both the free water and the free methyl ethyl ketone present in the phase of lower specific gravity can be removed easily without substantial loss of the desired peroxidic reaction products. Also, a highly active product consisting essentially of a single acyclic methyl ethyl ketone peroxide is obtainable from the phase of lower specific gravity by extraction with a low boiling hydrocarbon solvent such as hexane or pentane.

Advantageously, the oxidatively active materials produced from methyl ethyl ketone and hydrogen peroxide in the manner above described are combined with a carrier material. Where the carrier material is a finely particulate solid, the liquid reaction product mixture can be combined therewith in such proportions that the liquid amounts to as much as 35% by weight of the combined liquid and carrier. For some purposes, the entire reaction product mixture can be combined with the carrier, the step of separating the phase of lower specific gravity being omitted. A more highly active composition, having greater utility, is obtainable, however, by recovering the phase of lower specific gravity from the liquid reaction product mixture, then at least substantially reducing the free water content of the recovered phase, and then combining the concentrated oxidatively active liquid with the carrier material. It is also advantageous to obtain a hexane or like extract of the phase of lower specific gravity and combine such extract with the carrier material, with or without removal of the hexane or other extraction medium.

As has been pointed out, the phase of lower specific gravity resulting from reaction of methyl ethyl ketone and hydrogen peroxide in the manner described contains, in addition to methyl ethyl ketone peroxide, a substantial proportion of unreacted methyl ethyl ketone. Thus, about 20–40% by weight of the phase of lower specific gravity may be free methyl ethyl ketone. Advantageously, this free methyl ethyl ketone is left in the liquid material until after the same has been combined with the carrier material, and the free ketone is then at least largely removed by volatilization. Thus, employing a particulate solid carrier material, the free ketone is removed by aerating the product, with or without the aid of reduced pressure, at a temperature not exceeding 125° C. Assuming that a relatively large proportion of the oxidatively active liquid reaction product mixture is combined with a solid carrier material such as a cereal flour, especially good results are obtained by aerating with the aid of vacuum at a temperature of 30–50° C. In general, the temperatures employed during removal of the free methyl ethyl ketone can be increased if (1) the relative proportion of methyl ethyl ketone peroxides introduced to the carrier is small or (2) the product introduced to the carrier contains only small proportions of materials other than acyclic methyl ethyl ketone peroxides and free ketone.

While the process is operable with the proportion of hydrogen peroxide in the initial reaction mixture ranging from .5 to 2.5 moles per mole of the ketone, superior results are obtained when the hydrogen peroxide ranges from 1 to 1.5 moles per mole of ketone. Such proportions provide good reaction rates and greater yields of methyl ethyl ketone peroxides. Within the limits specified, increasing the relative proportion of methyl ethyl ketone will increase the volume of the lower specific gravity material, also increasing the proportion of free ketone therein, while an increase in the relative proportion of hydrogen peroxide will increase the volume of the higher specific gravity product, also increasing the proportion of free hydrogen peroxide therein.

The rate of reaction and the yield of peroxides also depends upon the concentration of hydrogen peroxide in the initial reaction mixture. In this connection, the hydrogen peroxide is preferably employed in the form of an aqueous solution containing at least 25% by volume hydrogen peroxide, and considerable water is thus introduced into the reaction mixture. While the presence of water is not essential to the reaction, it is required in order that the reaction product mixture will separate into phases of lower and higher specific gravity, the phase of higher specific gravity retaining those compounds which are more soluble in water. In order to obtain the advantages of phase separation and still maintain good reaction rates and yields, the proportion of water in the initial reaction mixture, whether added with the hydrogen peroxide or otherwise, is kept in the range of 10–50% by volume, based on the total reaction mixture. Thus, an aqueous hydrogen peroxide solution should not be used which is so dilute as to provide, for the particular proportion of hydrogen peroxide chosen, an amount of water in excess of 50% of the volume of the initial reaction mixture. On the other hand, if an amount of water less than 10% of the volume of the initial reaction mixture is provided by addition of the hydrogen peroxide solution, additional water should be added to provide the minimum amount necessary for phase separation.

The reaction is rather strongly exothermic initially. However, if the reaction mixture is cooled for an initial period sufficient to remove the exothermic heat, cooling can then be terminated and the reaction mixture will remain cool for the balance of the reaction period.

Best yields of methyl ethyl ketone peroxides are obtained in the shortest reaction time when the reaction mixture is maintained at a temperature within the range of 15–70° C. Within such temperature range, and with the proportion of hydrogen peroxide being from 1 to 1.5 moles per mole of methyl ethyl ketone, the other process variables being controlled as hereinbefore discussed, the phase of lower specific gravity will amount to from 35–80% by volume of the reaction product mixture, as much as 80% by weight of such lower specific gravity phase being methyl ethyl ketone peroxides, the predominant portion of the organic peroxide content being an individual acyclic methyl ethyl ketone peroxide as yet not completely characterized.

While the reaction proceeds at temperatures up to 100° C., the yield of the desired peroxides obtained in a given reaction time decreases as the temperature is raised above about 80° C. The reaction rate is also decreased when the temperature of the reaction mixture is decreased below 15° C. but, by extending the reaction time, good yields can be obtained at temperatures on the order of 10° C. and lower.

Excellent results are obtained by combining the reactants at room temperature, cooling the reaction mixture initially to absorb exothermic heat, and then allowing the reaction mixture to continue for the selected time period at room temperature.

When the reaction is carried out at elevated temperatures, phase separation is accomplished by cooling the liquid product to about room temperature.

While other acid catalysts can be employed, best results have been obtained with the mineral acids in amounts up to about 5% by weight of the reaction mixture. Among the mineral acids, the ability of the acid to catalyze the reaction varies between the individual acids. Thus, while excellent reaction rates and yields are attained by using 0.04–1% by weight of hydrochloric or sulfuric acid, the equivalent results are achieved with 0.4–4% of phosphoric acid. Practical reaction times on the order of 1 minute are provided when 1% of hydrochloric or sulfuric acid is employed and when 4% of phosphoric acid is employed. Without catalyst, the reaction time can be extended to 48 hours.

The following example is illustrative of the reaction as carried out at various temperatures:

EXAMPLE 1

Four initial reaction mixtures, each weighing 100 g., hereinafter referred to as reaction mixtures A, B, C and D, were prepared by blending aqueous hydrogen peroxide (60% $H_2O_2$ by volume) and methyl ethyl ketone in proportions to provide 1 mole of hydrogen peroxide per mole of the ketone, each mixture including 5 ml. of 1 N hydrochloric acid.

Reaction mixture A was refluxed (85–90° C.) under a condenser for 20 min. To neutralize the acid, 5 ml. 1 N sodium hydroxide was then added, and the liquid product was then quickly cooled to room temperature and allowed to stand at room temperature for 24 hours.

Reaction mixture B was blended at room temperature, exothermic heat promptly raising the temperature of the reaction mixture to 60° C. The reaction mixture was then kept in a 60° C. water bath, maintaining the reaction mixture temperature at 50–60° C., until 20 minutes after blending and was then neutralized with 5 ml. 1 N sodium hydroxide and cooled to room temperature.

Reaction mixture C was blended at room temperature, maintained at that temperature for 20 min. by means of a cold water bath, and then neutralized with 5 ml. of 1 N sodium hydroxide.

Reaction mixture D was blended at room temperature, immediately cooled to 10° C., maintained at that temperature by an ice bath for 20 min. At the end of that period, no indication of phase separation was observed and the reaction period was extended to 55 min., the 10° C. temperature being maintained throughout the total period of 55 min.

In all four cases, the final reaction product mixture separated into two distinct phases. By means of a separatory funnel, the upper phase was recovered in each case, measured and analyzed, by procedures later described, for organic peroxide, hydrogen peroxide and methyl ethyl ketone. The results are as follows:

|  | Reaction Mixture | | | |
| --- | --- | --- | --- | --- |
|  | A | B | C | D |
| Volume of upper layer____ml__ | 75 | 63 | 72 | 76 |
| Organic peroxide content____percent__ | 33.4 | 47.5 | 56.4 | 51.0 |
| Hydrogen peroxide content____do__ | 6.3 | 2.1 | 1.8 | 1.0 |
| Methyl ethyl ketone content____do__ | 34.9 | 34.6 | 33.4 | 28.8 |
| Water (by difference)____do__ | 25.4 | 15.8 | 8.4 | 19.2 |

It is thus apparent that, considering equal reaction times of 20 minutes, superior results were obtained with mixtures B and C, at the intermediate temperatures. While the total quantity of organic peroxides obtained from mixture A approaches that obtained at the lower temperature from mixture B, the product from mixture A was obtained at the expense of adding heat and is in mixture with relatively larger volumes of hydrogen peroxide, free ketone and water, as compared to the product from mixture B. Through an excellent yield of organic peroxide was obtained from mixture C at 10° C., this was at the expense of cooling and more than doubling the reaction time.

EXAMPLE 2

An initially homogeneous liquid reaction mixture was prepared by blending 90.5 ml. methyl ethyl ketone, 85.5 ml. aqueous hydrogen peroxide solution (50% $H_2O_2$ by weight) and 5 ml. 1 N hydrochloric acid. The reaction mixture was maintained at approximately room temperature for 1 hour and, during this time, was agitated continually by means of a rotating magnetic stirrer to avoid premature phase separation. The resulting reaction product mixture was then neutralized by addition of 5 ml. 1 N sodium hydroxide, the neutralized liquid being allowed to stand at room temperature until it had separated into distinct upper and lower phases. Using a separatory funnel, the upper phase was recovered and found to have a volume of 93 ml.

The recovered upper phase was freed of water by means of anhydrous sodium sulfate and was then analyzed for organic peroxide, free hydrogen peroxide and free methyl ethyl ketone, the results being as follows:

| | Percent |
| --- | --- |
| Organic peroxide content | 77.9 |
| Free hydrogen peroxide | 1.0 |
| Free methyl ethyl ketone | 21.1 |
| | 100.0 |

In comparison, the lower phase was found to contain 9.7% free hydrogen peroxide, 6.6% free methyl ethyl ketone, 3.5% of organic peroxide identical with that of the upper phase, and 10.7% of unidentified water soluble, hexane insoluble organic peroxide.

The recovered lower specific gravity phases of products A–D of Example 1 and the product of Example 2 all have utility, for example, in the preparation of compositions for bleaching and maturing wheat flour for oxidatively improving bread doughs and the like.

The following examples further illustrate the invention in connection with preparation of novel compositions for bleaching wheat flour and the like:

EXAMPLE 3

An initially homogeneous liquid reaction mixture was prepared by blending 25 ml. aqueous hydrogen peroxide solution (37% $H_2O_2$ by volume), 50 ml. methyl ethyl ketone and 0.05 ml. concentrated sulfuric acid. The reaction mixture was maintained substantially at room temperature for 1 hour, at the end of which time the liquid had separated into distinct upper and lower layers. The upper phase was recovered and the proportion of free methyl ethyl ketone therein removed by maintaining the liquid over a hot water bath for 30 minutes. The resulting liquid product was freed of water by means of anhydrous sodium sulfate. By titration, the resulting product was found to have a hydrogen peroxide equivalent content of 32.6% by weight.

A carrier-supported composition suitable for bleaching flour was prepared by blending 40 ml. of the liquid product so obtained with 100 g. of dry, food grade corn starch and drying the mixture at room temperature under an exhaust hood for 30 minutes. The carrier-supported comported composition was found to have a hydrogen peroxide equivalent content of 4.9% by weight.

Bleaching ability of the carrier-supported composition was determined with a commercially available bread wheat flour having a carotene content of 3.05 p.p.m. Five equal samples of the flour were measured, sample A being used as control and the carrier-supported composition of this example being blended with samples B, C, D and E in proportions carrying into the flour hydrogen peroxide equivalent contents of .003, .0045, .006 and .045 by weight, respectively. Carotene in parts per million was determined periodically for the five samples, the results being as follows:

*Carotene Content in p.p.m.*

| Days | Sample A | Sample B | Sample C | Sample D | Sample E |
|---|---|---|---|---|---|
| 0 | 3.05 | 3.05 | 3.05 | 3.05 | 3.05 |
| 2 | | 2.26 | 1.91 | 1.57 | 1.05 |
| 9 | 2.88 | 2.13 | 1.40 | 0.87 | 0.31 |
| 56 | 2.19 | 1.57 | 0.45 | 0.12 | |

EXAMPLE 4

An initially homogeneous liquid reaction mixture was prepared by blending 57 ml. of aqueous hydrogen peroxide solution (60% $H_2O_2$ by volume), 89.5 ml. of methyl ethyl ketone and 5 ml. of 1 N hydrochloric acid. The reaction mixture was maintained substantially at room temperature for a period of 30 min., being agitated continuously during that period by means of a rotating magnetic stirrer. The resulting liquid was neutralized by addition of 5 ml. of 1 N sodium hydroxide and was then allowed to stand until it had separated into distinct upper and lower phases. The upper phase was recovered by means of a separatory funnel.

Of the recovered liquid, 50 ml. was extracted with 500 ml. of hexane, extraction being carried out at room temperature with continual agitation for 30 min. and the hexane then removed under vacuum, leaving as the residue a viscous liquid product.

A carrier-supported composition suitable for use in bleaching flour and the like was prepared by blending 2 g. of the viscous liquid product with 10 g. of dry, food grade corn starch and aspirating the resulting blend for 30 min. at room temperature with air to remove any remaining traces of hexane or other volatiles. The resulting product was found to have a hydrogen peroxide equivalent content of 4.35% by weight.

Three equal samples of a commercially available bread wheat flour having a carotene content of 2.08 p.p.m. were measured. Of the three samples, sample A was employed as control and samples B and C were blended with sufficient quantities of the carrier-supported composition of this example to introduce into the flour hydrogen peroxide contents of .003 and .006% by weight, respectively. The carotene content of the three samples was determined after four days and twelve days, the results being as follows:

*Carotene Content in p.p.m.*

| Days | Sample A | Sample B | Sample C |
|---|---|---|---|
| 0 | 2.08 | 2.08 | 2.08 |
| 4 | 2.01 | 0.84 | 0.71 |
| 12 | 1.94 | 0.29 | 0.22 |

The following examples illustrate the preparation of oxidatively active compositions, in accordance with the invention, useful for improving bread doughs:

EXAMPLE 5

An initially homogeneous liquid reaction mixture was prepared by blending 50 ml. of aqueous hydrogen peroxide solution (35% $H_2O_2$ by volume) with 50 ml. methyl ethyl ketone and 0.5 ml. aqueous sulfuric acid (10% $H_2SO_4$ by volume). The reaction mixture was heated on a boiling water bath, using a reflux condenser, for a period of one hour and was then allowed to stand at room temperature until the end product had separated into distinct upper and lower phases. The upper phase, having a volume of 46 ml., was recovered by means of a separatory funnel and treated with anhydrous sodium sulfate for removal of dissolved water.

Of the recovered, now substantially water-free liquid product, 40 ml. was blended with 100 g. dry, food grade corn starch and the resulting blend then extended with an additional 400 g. of the same starch. To provide a final composition having a hydrogen peroxide equivalent content of 0.36% by weight, 300 g. of the starch-recovered liquid mixture was further blended in a batch mixer with 700 g. of the same corn starch and the 1,000 g. of final product was then heated, with occasional stirring, for 40 min. over a boiling water bath.

Included in conventionally-prepared doughs for making white bread, the oxidatively active composition of this example provides definitely better dough handling qualities and allows the use of as much as 3% additional water when the oxidatively active composition is added at the rate of 1% by weight of the flour employed in making the dough.

EXAMPLE 6

An initially homogeneous liquid reaction mixture was prepared by blending 50 ml. aqueous hydrogen peroxide solution (35% $H_2O_2$ by volume), 50 ml. methyl ethyl ketone and 1 ml. of aqueous sulfuric acid (10% $H_2SO_4$ by volume). The reaction mixture was refluxed over a water bath, employing a suitable condenser, for 30 min. and was then allowed to stand until the liquid separated into distinct upper and lower layers. The upper layer, amounting to 49 ml., was recovered by means of a separatory funnel and the dissolved water was removed by treatment with anhydrous sodium sulfate.

Of the recovered liquid, 43 ml. was blended with 500 g. of dry, food grade corn starch, and the resulting blend was heated for 40 min. at 100° C. for removal of volatiles. One hundred g. of the resulting carrier-supported composition was extended with an additional 100 g. of the same corn starch, the composition then being heated for 30 min. at 100° C. The final carrier-supported composition was found to have a hydrogen peroxide equivalent content of 0.68% by weight.

Included in conventionally-prepared doughs for making white bread, the composition of this example provides, when employed at the rate of .25% by weight of the flour used in the dough, a dough improving action at least fully equivalent to that obtained with the same amount of calcium peroxide.

EXAMPLE 7

An initially homogeneous liquid reaction mixture was prepared by blending 50 ml. aqueous hydrogen peroxide (35% $H_2O_2$ by volume), 50 ml. methyl ethyl ketone and 1 ml. aqueous hydrochloric acid (1 part conc. HCl to 1 part water). The reaction mixture was maintained substantially at room temperature for 1.5 hours, being agitated continuously throughout such period by means of a rotating magnetic stirrer. The mixture was then allowed to stand without stirring until it separated into two distinct upper and lower phases and the upper phase, amounting to 45.5 ml., was recovered and dried with anhydrous sodium sulfate. A carrier-supported composition was prepared by blending 15 ml. of the recovered liquid with 300 g. dry, food grade corn starch and heating the resulting mixture at 100° C., with intermittent stirring, for 75 min. The final product was found to have a hydrogen peroxide equivalent content of 0.78% by weight.

Employed in conventionally-prepared doughs for the production of white bread, the carrier-supported composition of this example provides excellent improving actions, including an increase of 3% in water absorption, when the composition is used in an amount equal to .25% of the weight of the flour employed in making the dough.

Analytical Procedures

Total peroxide content of the reaction products prepared as hereinbefore described can be determined by (1) potassium iodide-thiosulfate titration, using aqueous sulfuric acid (1 part $H_2SO_4$ to 9 parts water by volume) or (2) modified Wheeler titration, omitting chloroform. The results are expressed as the hydrogen peroxide equivalent value.

Free hydrogen peroxide is determined as follows: *Step 1.*—A 0.05 g. sample of the material to be analyzed is combined with 25 ml. water and 1 mg. catalase and allowed to react for 30 min. *Step 2.*—Twenty-five ml. aqueous sulfuric acid (1 part conc. $H_2SO_4$ to 4 parts water by volume) is added, followed by 1 ml. saturated potassium iodide solution. *Step 3.*—The solution is titrated with standard thiosulfate to give the total organic peroxide content, free hydrogen peroxide having been destroyed by the catalase in step 1. *Step 4.*—subtract the total organic peroxide content, determined in step 3, from the total peroxide content, the difference being free hydrogen peroxide.

Free methyl ethyl ketone is measured as follows: *Step 1.*—Combine 200 ml. of .3% fresh hydroxylamine hydrochloride and a .2 g. sample of the material to be analyzed and allow to stand for 3 min. *Step 2.*—Titrate with standard .1 N sodium hydroxide until pH is brought to the original pH of the hydroxylamine hydrochloride solution. *Step 3.*—Compute percent free methyl ethyl ketone as follows:

$$\frac{(\text{Titration value}) (0.00777) (100)}{\text{Sample weight}} =$$

Percent methyl ethyl ketone

Characterization of Methyl Ethyl Ketone Peroxide Constituting Predominant Proportion of Reaction Product While not as yet identified with complete accuracy, the acyclic methyl ethyl ketone peroxide which constitutes the predominant proportion of the product resulting from reacting methyl ethyl ketone and hydrogen peroxide in accordance with the method hereinbefore described appears to be bis-(1,1'-hydroperoxy 1,1'-ethyl) diethyl peroxide, having the formula

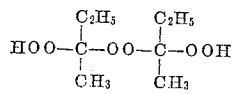

The compound titrates in the same fashion as bis-(1,1'-hydroperoxy 1,1'-methyl) diethyl peroxide, the corresponding compound derived from acetone.

Active oxygen was determined for the methyl ethyl ketone peroxide in question in the following manner: The phase of lower specific gravity produced in accordance with Example 1 was recovered and extracted with hexane, the solvent and free ketone then being removed from the extract by fractional distillation under vacuum. The residue from the distillation step was then dissolved in cold hexane, dried with anhydrous sodium sulfate and cooled to −70° C. on a Dry Ice-ethyl bath, causing the peroxide to be thrown down as a heavy, oily liquid. The hexane was decanted, the purified product recovered, and the procedure repeated. The active oxygen content of the finally recovered, purified product was determined by titration with .1 N thiosulfate and computed in accordance with the following formula:

$$\frac{(\text{Titration value}) (.0008) (100)}{\text{Sample weight}} =$$

percent active $O_2$ by weight

The active oxygen was found to be 22.4% by weight, .2% less than the theoretical active oxygen content of bis-(1,1'-hydroperoxy 1,1'-ethyl) diethyl peroxide.

In similar determinations, the material thrown down from the cold hexane solution has varied from a solid to a heavy liquid at room temperature, apparently due to the presence of varying, small amounts of impurities.

Both the active oxygen determination and the fact that the corresponding cyclic compounds are not titratable by the thiosulfate procedure indicate that the product is the acyclic dimeric peroxide of methyl ethyl ketone.

We claim:
1. The method comprising combining methyl ethyl ketone, hydrogen peroxide in an amount providing .5–2.5 moles of hydrogen peroxide per mole of methyl ethyl ketone, and 0–5% by weight of a mineral acid catalyst; maintaining the resulting mixture in liquid form at a temperature below 100° C. for a period of from about 1 minute to 48 hours, depending upon the concentration of hydrogen peroxide and catalyst in the initial mixture, and thereby causing the methyl ethyl ketone and hydrogen peroxide to react; and recovering, as a product capable of bleaching organic materials, a composition having a substantial titratable peroxide content, which titratable peroxide content predominantly comprises acyclic hydroperoxides of methyl ethyl ketone.

2. The method of claim 1 wherein said catalyst is selected from the group consisting of hydrochloric acid and sulfuric acid and is employed in an amount equal to 0.04–1% by weight.

3. The method of claim 1 wherein said catalyst is phosphoric acid and is employed in an amount equal to 0.4–4% by weight.

4. The method for preparing an oxidatively active composition capable of bleaching organic materials, comprising combining methyl ethyl ketone, aqueous hydrogen peroxide in an amount providing .5–2.5 moles of hydrogen peroxide per mole of methyl ethyl ketone, and 0–5% by weight of a mineral acid catalyst, to form a liquid reaction mixture containing water in an amount equal to 10–50% by volume; maintaining said mixture in liquid form at a temperature below 100° C. for a period of from 1 minute to 48 hours, depending upon the initial concentration of hydrogen peroxide and catalyst, and thereby causing the methyl ethyl ketone and hydrogen peroxide to react to form a product tending to separate out of the reaction mixture; allowing the resultant reaction mixture to separate into phases of lower and higher specific gravity; recovering the phase of lower specific gravity as a liquid composition predominantly comprising free methyl ethyl ketone, water and at least one acyclic hydroperoxide of methyl ethyl ketone; and combining the recovered composition with a carrier material.

5. The method of claim 4 wherein said carrier material is a finely particulate solid and at least the predominant proportion of said free methyl ethyl ketone is removed by volatilization at a temperature not exceeding 125° C. after the recovered composition has been combined with said carrier material.

6. The method for preparing an oxidatively active composition comprising combining methyl ethyl ketone, aqueous hydrogen peroxide in an amount providing 1–1.5 moles of hydrogen peroxide per mole of methyl ethyl ketone, and 0–5% of a mineral acid catalyst to provide an initial liquid reaction mixture containing water in an amount equal to 10–50% by volume; maintaining said mixture at 15–17° C. for a time period of from 1 minute to 48 hours, depending upon the concentration of hydrogen peroxide and catalyst employed, and thereby causing the methyl ethyl ketone and hydrogen peroxide to react to form a product which tends to separate out of the reaction mixture; allowing the resulting reaction mixture to separate into phases of lower and higher specific gravity; and recovering as a product the phase of lower specific gravity in an amount equal to 35–80% by volume of the reaction product mixture, the material so recovered predominantly comprising free methyl ethyl ketone, water and titratable organic peroxide, the predominant proportion of the titratable organic peroxide content of the recovered material being an individual acyclic hydroperoxide of methyl ethyl ketone having an active oxygen content of about 22.4% by weight.

7. The method for producing an essentially pure, individual, acyclic hydroperoxide of methyl ethyl ketone which is titratable by thiosulfate titration and has an active oxygen content of about 22.4% and is capable of maturing and bleaching flour, comprising combining methyl ethyl ketone and aqueous hydrogen peroxide, in proportions providing .5–2.5 moles of hydrogen peroxide per mole of methyl ethyl ketone, to form a liquid reaction mixture containing water in an amount equal to 10–50% by volume;

maintaining said mixture in liquid form at a temperature below 100° C. for a period not exceeding 48 hours and thereby causing the methyl ethyl ketone and hydrogen peroxide to react;

allowing the resultant reaction product mixture to separate into phases of lower and higher specific gravity;

recovering the phase of lower specific gravity;

extracting the recovered phase with a low boiling hydrocarbon solvent;

recovering the extract; and removing the solvent from the recovered extract to leave said essentially pure individual acyclic peroxide as the residue.

8. The method for producing an oxidatively active composition useful for at least maturing flour, comprising combining methyl ethyl ketone, hydrogen peroxide and water to form a liquid mixture containing water in an amount equal to 10–50% by volume and .5–2.5 moles of hydrogen peroxide per mole of methyl ethyl ketone;

maintaining said mixture in liquid form at a temperature below 100° C. for a period not exceeding 48 hours and thereby causing the methyl ethyl ketone to react to form a liquid reaction product mixture having a substantial titratable peroxide content, which titratable peroxide content at least predominantly comprises acyclic hydroperoxides of methyl ethyl ketone and includes as a major constituent an individual acyclic hydroperoxide of methyl ethyl ketone which is titratable by thiosulfate titration and has an active oxygen content of approximately 22.4%; and combining at least said individual acyclic hydroperoxide with a carrier material.

References Cited in the file of this patent

UNITED STATES PATENTS

| | | |
|---|---|---|
| 2,133,733 | Moser | Oct. 18, 1939 |
| 2,365,534 | Ferrari | Dec. 19, 1944 |

FOREIGN PATENTS

| | | |
|---|---|---|
| 444,544 | Great Britain | Mar. 23, 1936 |

OTHER REFERENCES

Bjorklund et al.: "The Action of $H_2O_2$–$HNO_3$ Mixtures on Ketones," Transactions of the Royal Society of Canada, vol. 44, Series 3: June 1950.

Milas et al.: Studies in Organic Peroxides, 81 J.A.C.S., 5824–5826, November 5, 1959.

UNITED STATES PATENT OFFICE
CERTIFICATE OF CORRECTION

Patent No. 3,047,406             July 31, 1962

Charles G. Ferrari et al.

It is hereby certified that error appears in the above numbered patent requiring correction and that the said Letters Patent should read as corrected below.

Column 4, line 36, for "Through" read -- Though --; column 5, line 25, strike out "comported"; column 8, line 11, after "Dry Ice-ethyl" insert -- alcohol --.

Signed and sealed this 13th day of November 1962.

(SEAL)
Attest:

ERNEST W. SWIDER
Attesting Officer

DAVID L. LADD
Commissioner of Patents